May 5, 1936. P. L. TA'BOIS 2,039,567
AUTOMATIC CALENDAR
Filed May 19, 1934 3 Sheets-Sheet 1
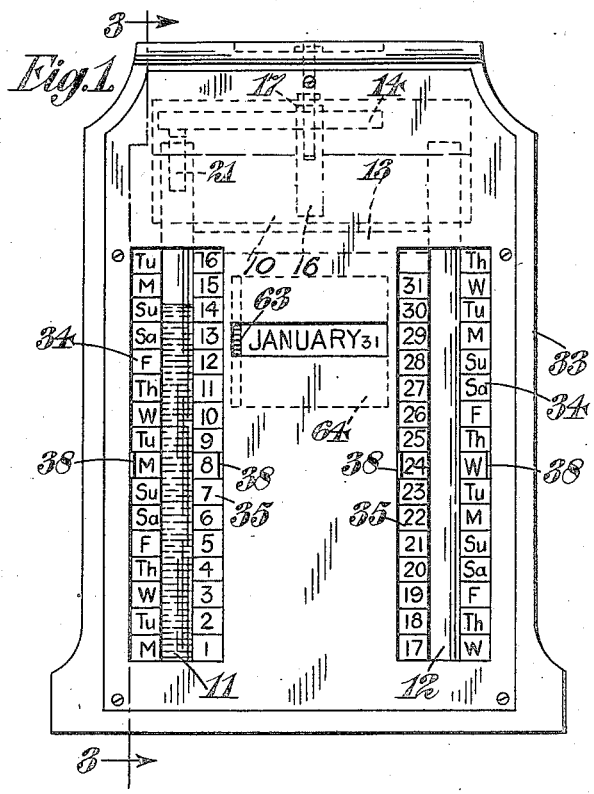
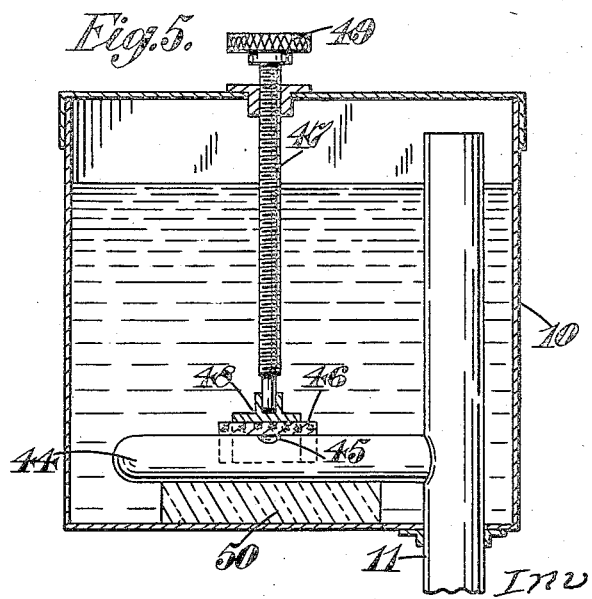

May 5, 1936.  P. L. TA'BOIS  2,039,567
AUTOMATIC CALENDAR
Filed May 19, 1934   3 Sheets-Sheet 2
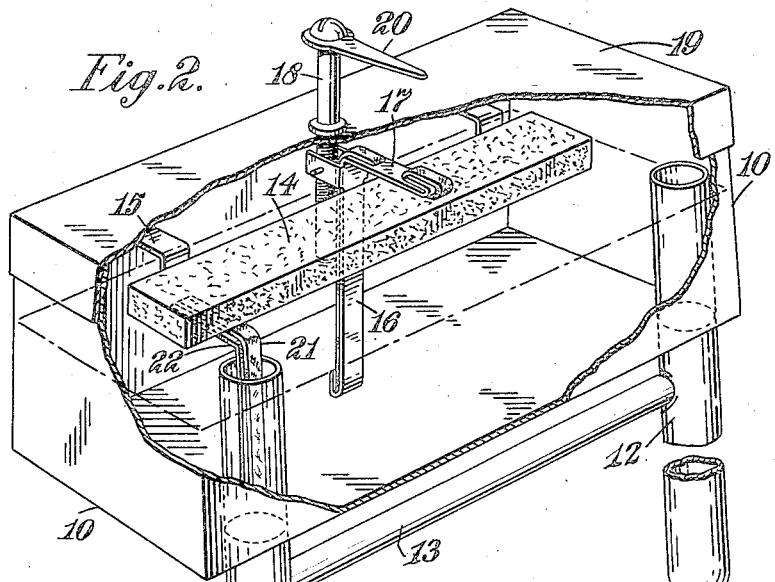
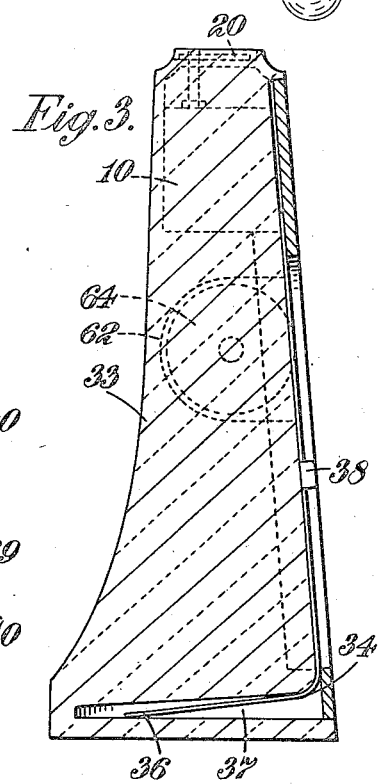
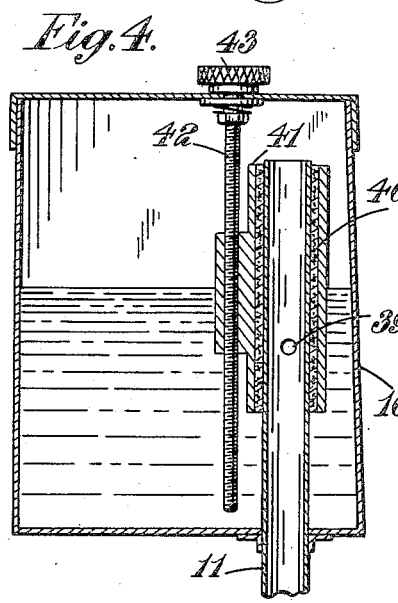
Inventor:
Percival Leo Ta'Bois,
By Byrnes, Stebbins & Blenko,
attys May 5, 1936.　　　P. L. TA'BOIS　　　2,039,567
AUTOMATIC CALENDAR
Filed May 19, 1934　　3 Sheets-Sheet 3
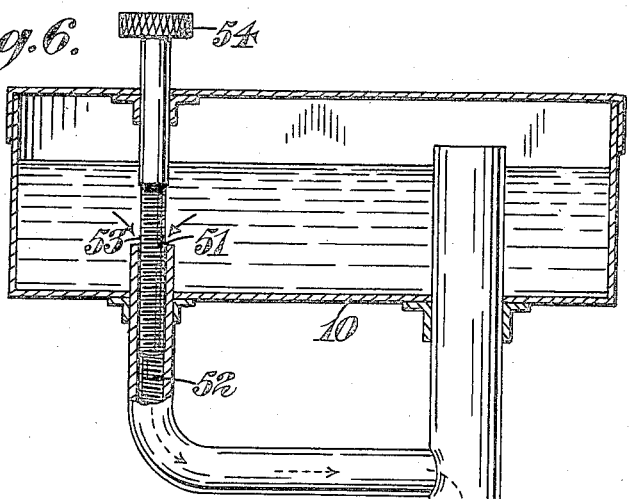
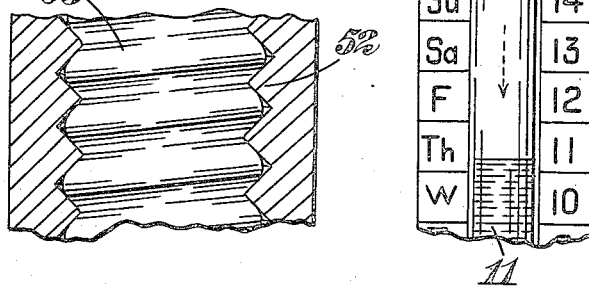
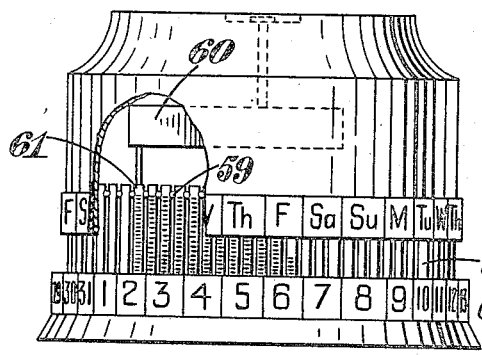

UNITED STATES PATENT OFFICE 2,039,567

AUTOMATIC CALENDAR

Percival Leo Ta'Bois, London, England, assignor of one-half to Ivor Tuckett, Cowes, Isle of Wight, England Application May 19, 1934, Serial No. 726,529
In Great Britain May 25, 1933

15 Claims. (Cl. 40—107)

This invention relates to apparatus wherein a flow of liquid from a vessel under the action of a force such as gravity may be caused to take place at a very slow and controlled rate, which rate preferably admits of regulation, and to the use of such apparatus as an automatic calendar by measurement of the quantity of liquid which has flowed over any period of time.

According to this invention an automatic calendar comprises in combination a vessel containing a liquid, a second vessel in communication with the first vessel, means for causing a flow of fluid from the first to the second vessel, means for restricting the rate of flow of the liquid, and a scale of days or months marked on or fitted to one of the vessels, whereby the scale indicates the quantity of fluid in that vessel, and, thus, the passage of time.

Broadly, the means for restricting and controlling the rate of flow of the liquid from the first to the second vessel is an absorbent or porous material through the pores of which the liquid passes at a suitably slow rate. Preferably, the restricted flow takes place through a syphon device which constitutes, or is associated with, the flow-restricting means.

According to another feature of the invention the apparatus is so constructed that by some simple operation such as tilting or inversion, the liquid can be rapidly returned from the second vessel to the first to effect the resetting of the calendar to a starting position; also, this free flow of liquid between the vessels may be utilized for the initial setting of the calendar, as for example if it is set in operation in the middle of the month.

In the accompanying drawings, which represent various embodiments of the invention, Figure 1 is a general view of the complete apparatus;

Figure 2 is a diagrammatic perspective view with parts broken away to show one construction of the device;

Figure 3 is a side view of Figure 1 in section on the line 3—3;

Figure 4 is a detail view showing diagrammatically a modified construction of flow-restricting device;

Figure 5 is a detail view showing diagrammatically another modified form of flow-restricting device;

Figure 6 is a diagrammatic view of yet another construction providing the restricted path;

Figure 7 is a detail view of Figure 6, and

Figure 8 is a view in elevation of a modified form of calendar.

Like reference characters indicate like parts throughout the drawings.

One mode of carrying this invention into effect is illustrated diagrammatically in Figure 2, in which 10 represents a tank containing the liquid; the area of this tank is made large compared with its depth, so that the removal from the tank of the amount of liquid necessary to indicate the total period of time covered by one cycle of the operation causes only a small relative change in the level of the liquid.

Another vessel, shown as a tube 11, communicates with the tank, being adapted to receive liquid flowing therefrom. This tube 11 is closed at its lower end and its open upper end communicates with the interior of the tank at a point above the highest liquid level therein. The tube is of small cross-sectional area compared with its length, and with the area of the tank, so that a small quantity of liquid flowing into the tube produces a marked difference in the level therein which can be easily measured and used to indicate the passage of time.

In order to avoid the use of an excessively long tube 11, and to provide a scale with conveniently large graduations to indicate the different days, one or more additional tubes 12 may be provided, this tube communicating with the tube 11 by an over-flow tube 13 situated near the upper end of the tube 11, so that after it has been filled, say in sixteen days, any further liquid delivered to it will over-flow into the tube 12 and indicate therein a further passage of time from the seventeenth to the thirty-first days of a month. If more than two such tubes are used the over-flow takes place from each one successively to the next adjacent tube. It may be convenient, for example, to make each tube indicate seven days, or a week, so that five tubes would be provided to cover the longest month but the last tube would not need to be graduated for more than three days.

In this particular embodiment of the invention the liquid is transferred from the tank to the tube 11 by means of a syphon device for which a wick of any suitable absorbent material is particularly convenient. The wick could be arranged with one end in the tank and the other end within the tube 12, but in order to provide better control for the rate of flow, it is preferred to provide a block 14 of porous material such as unglazed ceramic material, plaster of Paris, or the material used in the construction of porous cells or diaphragms. This block is supported on brackets 15 secured inside the tank, and is situated above the level of the liquid in the tank. The liquid is supplied to a point near one end of the block by a wick 16 which extends upwards from the liquid and horizontally on a suitable supporting arm so as to lie on the block. This arm 17 is arranged to be adjustable lengthwise of the block and in the particular construction illustrated this is effected by mounting it on a rotatable spindle 18 extending through the lid or cover 19 of the tank carrying the handle 20 outside. By rotation of the handle 20 the wick can be moved lengthwise of the block 14. Towards the other end of the block another wick 21 is supported in contact with it, preferably on the under-side, by means of a bracket 22, and this wick is laid horizontally over the open end of the tube 11 and extends downwards therein to a suitable depth. With this arrangement, the liquid in the tank rises up the wick 11 by the ordinary capillary effect, soaks into the porous member 14 and travels therealong to the wick 20 which collects it and delivers it into the tube 11. By varying the position of the wick 16 on the block the effective length of the block through which the liquid has to travel is varied, and thereby the rate of flow of the liquid can be varied within limits to permit adjustment and accurate regulation of the operation of the calendar.

It will be obvious that the position of the wick 21 lengthwise of the porous member 14 could also be made adjustable for the same purpose, if so desired.

When the liquid has filled the tube 11 it overflows through the tube 13 and commences to fill the tube 12, and on this tube being filled, say, at the end of a month, the device is reset for operation by inverting or tilting it so that the liquid in the tubes 11, 12 flows freely out from the open upper ends thereof into the tank 10. Since the wicks 16, 21 constitute a self-starting syphon the further operation of the device is entirely automatic.

If it is desired to start the operation of the calendar in the middle of the month liquid can be introduced directly into the tubes through the open end thereof by appropriately tilting the calendar.

Referring now to Figure 1, which shows the complete instrument, the tubes 11, 12 which are of transparent material, are displayed on the front of a stand or casing 23, the tank 10 and its associated parts being concealed within the upper part of this casing. Each of the tubes 11, 12, has associated with it a pair of scales; one of these indicated at 34 is marked with symbols indicating the day of the week, and the other, 35, is preferably furnished with numerals representing the days of the month. These scales are preferably formed on strips which are adjustable for a small range lengthwise of the tubes with which they are associated, and conveniently they are constituted by flexible metal strips whereof the lower ends 36, as shown in Figure 3, are housed in pockets 37 in the lower part of the casing 33. The depth of this pocket provides accommodation for the excess length of the strip to permit its adjustment, as aforesaid. The adjustment is effected manually and for this purpose each strip is formed with an outstanding lug 38, conveniently formed by cutting and bending up one edge of the strip so that it can be grasped by the fingers to push the strip up or down. The reason for providing this adjustment is principally to render it unnecessary, when setting the calendar in operation during the middle of the month, to adjust the level of the liquid with absolute accuracy to a fixed scale reading. It is very much simpler to fill the tube to approximately the right level and then make the necessary fine adjustment by moving the scale. Also, of course it is necessary to adjust the days of the week to suit the dates of the month for each particular month.

Instead of using a wick with or without a porous block as the flow-restricting device, various other arrangements may be used. Figure 4 shows diagrammatically an arrangement in which the tube 11 arranged with its open end above the liquid level of the tank 10, as above-described, is provided with a lateral orifice 39 at a point below the liquid level. Surrounding this part of the tube 11 is a sleeve 40 of leather or cloth or any other suitable porous material. A metal tube 41 surrounds this sleeve so that the liquid can enter the tube 11 by the orifice 39 only by passing lengthwise along the porous or absorbent material. The sleeve 41 is provided with an adjusting-screw 42 operated by a knurled head 43 outside the casing so that its position lengthwise of the tube 11 can be varied to vary the length of restricted path for the liquid.

Figure 5 illustrates yet another modification in which the restricted entry to the tube 11 is made by means of a lateral branch 44 in which an opening 45 is covered by a pad 46 of compressible absorbent or porous material; the liquid in this case enters the porous material at its edges or edges and margins, and means are provided for compressing the material to a greater or less extent in order to vary the rate of flow through it. Any convenient means may be used for this purpose and, as illustrated, a controlling-screw 47 operates on a shoe 48 which rests on the pad 46. The head 49 of the controlling-screw is accessible outside the tank 10. A suitable support 50 is provided under the tube 44 to withstand the pressure of the shoe 48.

Figures 6 and 7 illustrate yet another form of device for providing a variable restricted path of flow between the tank 10 and the tube 11. In this case the restricted entry to the tube 11 is provided by a lateral tube 51 which communicates with the interior of the tank 10 below the lowest liquid-level therein, and a plug is inserted in the open end of the tube 51 to constrict the area of the path of flow provided by it. By adjusting the plug to a greater or less depth in the open end of the tube 51 the length of the restricted path and therefore the rate of flow can be varied. As illustrated, the interior of the tube 51 is screw-threaded at 52 and the plug is also screw-threaded to co-operate therewith; the threads are of the same pitch but the height of the threads on the plug is reduced so as to provide a helical space at the bottoms of the threads in the tube. The cross-sectional area of this space can readily be made very small, and owing to its helical formation its length is very great so that a long and tortuous path of small cross-sectional area is thereby provided. Adjustment of the length of this path is effected by screwing the plug into or out from the open end of the tube, as required, there being a head 54 on the plug accessible outside the tank 10. Obviously, the helical space constituting the path of flow could be provided by reducing the height of the threads in the tube instead of the threads on the bolt, or, if desired, two separate paths could be provided by reducing both of them. The formation of these threads is illustrated as a detail in Figure 7.

Figure 8 illustrates yet another embodiment of the complete calendar, being designed to provide a construction in which the great length of the indicating tube 11 or 12 is obviated. In this case the vessel or tube which receives the liquid and thereby indicates the date, is constituted by a large number of small vessels or cells, conveniently allocated one to each day. These are arranged side-by-side, as shown at 55 in Figure 8, and are provided near their upper ends with connecting tubes or openings 59 whereby liquid can over-flow from any one which is filled to the next adjacent one. The liquid is supplied through a device 60, which may be any desired means for restricting the flow of liquid to one of the cells 61 so that this cell is filled first and any further liquid supplied, over-flows from it to the next adjacent cell, and so on, until they are all filled.

Suitable scales representing the days of the week and the days of the month are provided adjacent the cells 55 and these scales are preferably adjustable in a manner hereinbefore-described relatively to the cells. This arrangement of device lends itself particularly to constructions in a cylindrical form, in which the dates are distributed around the periphery of the cylinder and the whole is of a pleasing formation.

In yet another modification it is contemplated that the weight of the liquid delivered through the restricted path should be used to indicate the date; in this case the receiving vessel is mounted on a sensitive spring-balance or equivalent device and the movement due to the increase in weight of the vessel as the liquid flows into it, is used to operate a pointer moving over a scale or other equivalent indicator.

In all cases it is desirable that the apparatus should be hermetically sealed so as to prevent any loss of liquid either accidentally when resetting or by evaporation.

It was stated above that the supply tank 10 is of large area and the receiving vessel 11 of small area, and the purpose of this is to avoid or diminish as much as possible, variation in the rate of flow due to a change in the hydrostatic head. But since the change in head is only a small percentage of the hydrostatic head, it has been found that generally this effect is negligible, but if in any special circumstances it becomes noticeable, it can be readily compensated by making the scale divisions towards the end of the month (i. e. when the supply tank is approaching its lowest level) progressively slightly smaller than elsewhere. Alternatively, the cross-sectional area of the recording vessel or tube 11 could be appropriately varied so as to give scale readings of the same length for differing volumes of liquid delivered to it.

Obviously, also, in all cases where the indication is given by the presence of the liquid in a transparent tube it will be desirable to use a coloured liquid, and if desired diffusing or reflecting devices may be arranged behind or in the neighbourhood of the tube to make the presence of the liquid more clearly noticeable. It is also desirable that the liquid which is used should be one having a very low surface tension such, for example, as methylated spirit, or a very dilute solution of sodium carbonate or sodium hydroxide, although the invention is not limited to the use of these particular liquids.

In order to complete the calendar as illustrated in Figure 1, it is desirable to provide an adjustable indication for the months and this is conveniently effected by providing a cylinder 64 in a suitable recess 62 in the casing with the names of the months, and preferably also the number of days in each month, engraved or otherwise marked on its periphery. A window is provided in the front of the casing to exhibit the name of each month in turn and the cylinder itself is provided with a milled edge 63 (see Figure 1) or other convenient means whereby it may be rotated.

I claim:—

1. An automatic calendar comprising in combination a vessel containing liquid, a second vessel in communication with the first vessel, means for causing a flow of liquid from the first to the second vessel, means for restricting the flow from the first to the second vessel, a scale of days and months associated with one of said vessels indicating the quantity of liquid in that vessel, and means whereby liquid can be caused to flow freely in either direction between the vessels.

2. A calendar according to claim 1, wherein the means for restricting the flow of liquid is a tube whereof the length is great compared with the cross-sectional area.

3. An automatic calendar according to claim 1 comprising a tank of large area compared with its depth, and, a tubular vessel of great depth compared with its cross-sectional area, having the open end of the tubular vessel opening into the tank above the highest liquid level therein so that the liquid can be poured from the tube into the tank by inverting or tilting the calendar, and means providing an independent but restricted entry to the tubular vessel from the tank.

4. A calendar according to claim 1 wherein the second liquid receiving vessel is constituted by a plurality of vessels which are of small cross-sectional area compared with the first vessel and are interconnected to permit the liquid to over-flow from each to another, for the purpose described.

5. A calendar according to claim 1 wherein the scale or scales are adjustable relatively to the vessel wherewith they are associated, for the purpose described.

6. An automatic calendar comprising in combination a vessel containing liquid, a second vessel in communication with the first vessel, means for causing a flow of liquid from the first to the second vessel, and means for restricting the rate of flow from the first to the second vessel, said means comprising a tube whereof the length is great compared with the cross-sectional area, said tube having a plug inserted therein to reduce the cross-sectional area of the passage.

7. An automatic calendar comprising in combination a vessel containing liquid, a second vessel in communication with the first vessel, means for causing a flow of liquid from the first to the second vessel, means for restricting the rate of flow from the first to the second vessel, said means comprising a tube whereof the length is great compared with the cross-sectional area, said tube being internally threaded and having associated therewith a plug having threads of equal pitch but of different depth, so as to provide a helical conduit between them for a passage of liquid, and a scale associated with one of the vessels for indicating the quantity of liquid therein.

8. An automatic calendar comprising in combination a vessel containing liquid, a second vessel in communication with the first vessel, and means for causing a flow of liquid from the first to the second vessel, said latter means comprising an element of a porous or absorbent nature through the pores of which the liquid passes.

9. An automatic calendar comprising in combination a vessel containing liquid, a second vessel in communication with the first vessel, means for causing a flow of liquid from the first to the second vessel, said latter means comprising an element of a porous or absorbent nature, and means for adjusting the effective length of said element through which the liquid passes.

10. An automatic calendar comprising in combination a vessel containing liquid, a second vessel in communication with the first vessel, means for causing a flow of liquid from the first to the second vessel, said latter means comprising an element of a porous or absorbent nature through the pores of which the liquid passes, and means for compressing said element so that the rate of flow of the liquid therethrough may be varied.

11. In an automatic calendar, a tank of large area compared with its depth, a tubular vessel of great depth compared with its cross-sectional area, the open end of the tubular vessel opening into the tank above the highest liquid level therein, and means providing an independent restricted entry to the tubular vessel from the tank, said entry comprising a lateral opening in the tube below the lowest liquid level in the tank.

12. In an automatic calendar, a tank of large area compared with its depth, a tubular vessel of great depth compared with its cross-sectional area, the open end of the tubular vessel opening into the tank above the highest liquid level therein, and a syphon device to lift the liquid from the tank into the open end of the tube.

13. In an automatic calendar, a tank of large area compared with its depth, a tubular vessel of great depth compared with its cross-sectional area, the open end of the tubular vessel opening into the tank above the highest liquid level therein, and means associated with said lateral opening for controlling the flow of liquid therethrough.

14. In an automatic calendar, a tank of large area compared with its depth, a tubular vessel of great depth compared with its cross-sectional area, the open end of the tubular vessel opening into the tank above the highest liquid level therein, and a syphon device to lift the liquid from the tank into the open end of the tube, said syphon device comprising a wick extending into the liquid in the tank, a wick extending into the open end of the tubular vessel, and an element of a porous nature connecting said wicks.

15. An automatic calendar comprising in combination a vessel containing liquid, a second vessel in communication with the first vessel, means for causing a flow of liquid from the first to the second vessel, and means for restricting the rate of flow from the first to the second vessel, said means comprising a tube whereof the length is great compared with the cross-sectional area, said tube having a plug inserted therein to reduce the cross-sectional area of the passage, said tube being threaded and having associated therewith a number of threads of equal pitch but of different depth so as to provide a helical conduit between them for a passage of liquid, and a scale associated with one of the vessels for indicating the quantity of liquid therein.

PERCIVAL LEO TA'BOIS.